(12) United States Patent
Cahill

(10) Patent No.: US 10,197,429 B2
(45) Date of Patent: Feb. 5, 2019

(54) NUCLEAR DENSITY GAUGE

(71) Applicant: VEGA AMERICAS, INC., Cincinnati, OH (US)

(72) Inventor: Bonaventure Cahill, Crestview Hills, KY (US)

(73) Assignee: Vega Americas, Inc., Cincinnati, OH (US)

( * ) Notice: Subject to any disclaimer, the term of this patent is extended or adjusted under 35 U.S.C. 154(b) by 741 days.

(21) Appl. No.: 13/621,490

(22) Filed: Sep. 17, 2012

(65) Prior Publication Data
US 2013/0087715 A1    Apr. 11, 2013

Related U.S. Application Data

(60) Provisional application No. 61/535,351, filed on Sep. 15, 2011.

(51) Int. Cl.
G01F 23/28    (2006.01)
G01F 23/288   (2006.01)

(52) U.S. Cl.
CPC ................. G01F 23/2885 (2013.01)

(58) Field of Classification Search
CPC ......................................... G01N 23/06
See application file for complete search history.

(56) References Cited

U.S. PATENT DOCUMENTS 2,737,592 A * 3/1956 Ohmart .............. G01F 23/288
                                                    250/357.1
3,098,154 A * 7/1963 Crump .............. G01F 23/288
                                                    250/357.1
(Continued)

FOREIGN PATENT DOCUMENTS

EP    2 169 389 A1    3/2010
GB    2059581         4/1981
(Continued)

OTHER PUBLICATIONS

International Search Report dated Feb. 16, 2010 in related European application No. 09000721.2-2204.
(Continued)

Primary Examiner — Michael C Bryant
(74) Attorney, Agent, or Firm — Wood Herron & Evans LLP

(57) ABSTRACT

A nuclear level sensing gauge for a vessel 10 comprises a vertical source well 12 and one more level sensing detectors 22 mounted to vertically spaced nozzles, where the sources 30 in the source well 12 are distributed sources which emit a radiation pattern illuminating a length of greater than one inch of the respective level sensing nozzle, so that thermal expansion or contraction of the vessel 10 does not significantly alter radiation illuminating each detector 22. In a second embodiment, a vessel 10 includes plural level sensing nozzles and plurality of level sensing wells 12', each nozzle and level sensing well 12' positioned adjacent to one another such that a source in the well illuminates a detector 22 on the nozzle. Because the respective level sensing wells 12' and level sensing nozzles are closely adjacent to one another, thermal expansion or contraction of the vessel does not significantly alter the illumination of the detector 22.

11 Claims, 5 Drawing Sheets

(56) References Cited

U.S. PATENT DOCUMENTS

| | | | |
|---|---|---|---|
| 3,100,841 A | | 8/1963 | Reider |
| 3,473,021 A | | 10/1969 | Elliott et al. |
| 3,594,575 A | * | 7/1971 | Shoemaker ......... G01F 23/2885 |
| | | | 378/52 |
| 3,668,392 A | | 6/1972 | Bajek et al. |
| 4,580,052 A | | 4/1986 | Hoffman et al. |
| 5,564,487 A | * | 10/1996 | Cahill .................. B22D 11/206 |
| | | | 164/151.3 |
| 7,214,309 B2 | | 5/2007 | Chen et al. |
| 7,238,273 B2 | | 7/2007 | Chen et al. |
| 7,986,766 B2 | | 7/2011 | Cahill |
| 2006/0163115 A1 | | 7/2006 | Montanari et al. |
| 2010/0080352 A1 | * | 4/2010 | Cahill ............................. 378/54 |
| 2012/0020457 A1 | * | 1/2012 | Cahill .................. G01F 23/288 |
| | | | 378/52 |

FOREIGN PATENT DOCUMENTS

| | | |
|---|---|---|
| WO | 03/012378 A | 2/2003 |
| WO | 07/004897 A | 1/2007 |

OTHER PUBLICATIONS

International Search Report and Written Opinion dated Dec. 13, 2012 from EPO, related to PCT/US2012/055751.
AEA Technology QSA X38 Series, Caesium-137 Gamma Sources, Information Sheet Ref. B11, Ver. 2004-1112, 2004.
AEA Technology X38 Capsule Assembly, Descriptive Drawing, Nov. 2002.
AEA Technology X38_2 Inner Capsule Assembly (X7 Actual), Descriptive Drawing, Feb. 2005.

* cited by examiner

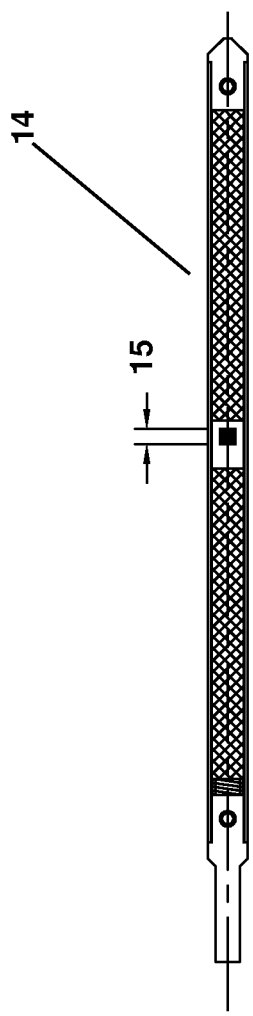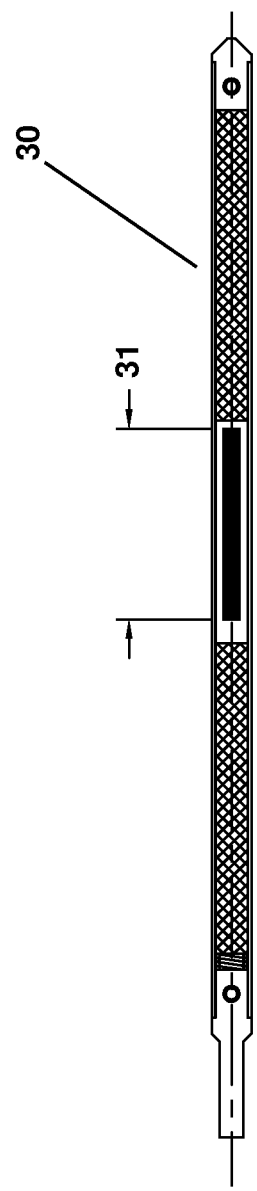

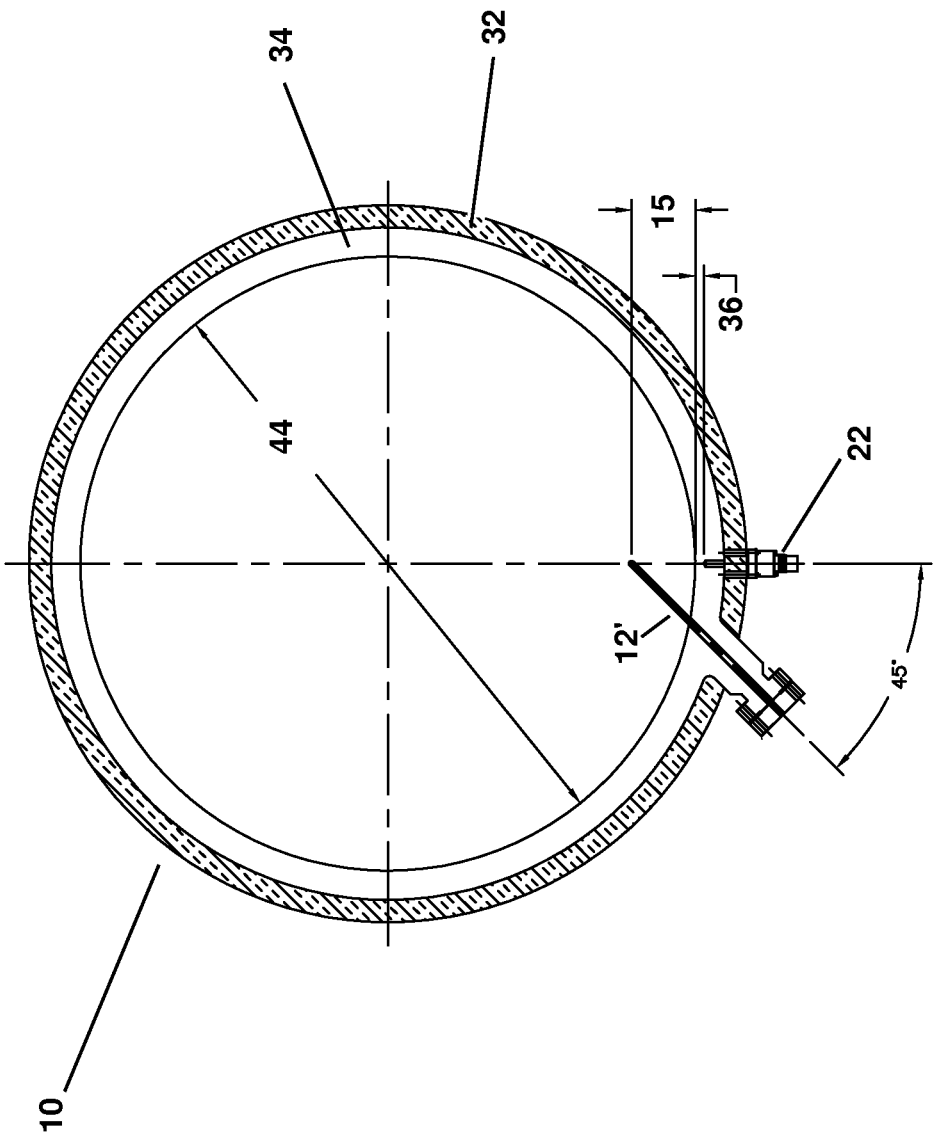

NUCLEAR DENSITY GAUGE

CROSS-REFERENCE TO RELATED APPLICATIONS

This Application claims the benefit of U.S. Provisional Application No. 61/535,351 filed on Sep. 15, 2011, which is related to application Ser. No. 13/190,461 filed Jul. 25, 2011 and to application Ser. No. 12/242,177 filed on Sep. 30, 2008, the entirety of each of which is hereby incorporated by reference in this application as if fully set forth herein.

BACKGROUND OF THE INVENTION

Problems have been experienced with level sensing in thick walled containers such as the vessel 10 seen in FIG. 1. Notably, a main variable in such environments is growth and shrinkage of the vessel with temperature. In some installations, a source well 12 is suspended from the top end of the vessel, about twenty to thirty inches from the interior vessel wall as seen at 15. Point source(s) are placed in the source well at locations aligned with one or more detectors 22.

The point sources encapsulate the radioactive material distributed over a length of one-quarter to three-quarter inches. Nominally, the position of the radioactive material is centered on the location of the corresponding detector 22. However, expansion and contraction of the vessel 10 tends to misalign a source and detector from the precise alignment at the calibration temperature. If the vessel openings are two inch diameter and the wall is six to twelve inches thick, the source(s) only have to change alignment a fraction of an inch for the source to no longer properly illuminate the detector.

The above-referenced applications disclose a level sensing gauge installable through a single nozzle which addresses the above-noted issue. The single nozzle device maintains alignment of the source and detector, independent of temperature related growth and shrinkage of the vessel, by using the same nozzle in the vessel for the source mounting and the detector mounting.

Although the single nozzle solution described in the above-referenced and incorporated patent filings addresses the thermal alignment problems elegantly, it does require some reconfiguring of the sources and detectors and may not be attractive for some existing installations which are already outfitted with a source well and detectors aligned therewith. Moreover, in some installations it may be desireable not to use a single nozzle for a source and detector, e.g., to permit more independent maintenance or inspection of a detector and source. Thus, there remains a need for additional solutions for nuclear based level sensing large vessels that accommodate for thermal expansion of the vessel.

BRIEF SUMMARY OF THE INVENTION

The present invention addresses the above needs in two ways.

In a first aspect, the invention features a level sensing gauge for a vessel comprising a source well and one more level sensing nozzles, comprising one or more distributed sources of radiant energy inserted within the source well, and one or more detectors of radiant energy positioned outside the vessel in registration with the one or more level sensing nozzles. The one or more distributed sources are configured to radiate energy toward respective ones of the one or more level sensing nozzles, in a radiation pattern illuminating a length of greater than one inch of the respective level sensing nozzle, such that thermal expansion or contraction of the vessel that alters the alignment of the source and nozzle does not significantly alter the amount of radiation illuminating the level sensing nozzle.

In the disclosed particular embodiments of this aspect, there are plural detectors and plural sources, each positioned as recited above. Furthermore, the sources of radiant energy are radioactive sources and the detectors are radioactive detectors.

Another aspect of the invention features a level sensing radioactive source per se, as used in the above-described aspect, having the feature that the source provides an elongated, distributed activity pattern over a length greater than one inch, permitting its use in a level sensing gauge according to the first aspect of the invention to ameliorate the effects of thermal expansion or contraction of a vessel that is subject to level detection.

In a third aspect, the invention features a level sensing gauge, comprising a vessel comprising a plurality of level sensing nozzles and a plurality of level sensing wells, each nozzle and level sensing well positioned adjacent to one another. One or more sources of radiant energy are inserted within each of the one or more level sensing wells, and one or more detectors of radiant energy are positioned outside the vessel in registration with the one or more level sensing nozzles. The one or more sources are configured to radiate energy toward respective ones of the one or more level sensing nozzles and the detector in registration therewith. Because the respective level sensing wells and level sensing nozzles are adjacent to one another, thermal expansion or contraction of the vessel does not significantly alter the amount of radiation illuminating the level sensing nozzle.

In the disclosed particular embodiments of this aspect, the sources of radiant energy are radioactive sources and the detectors are radioactive detectors, and the adjacent level sensing nozzle and level sensing well are positioned at an approximately identical vertical height, and spaced from each other less than one quarter of the horizontal distance around the vessel at that vertical height. The centerline axis of the level sensing nozzle and level sensing well are at an angle of forty-five degrees, and the source well extends into the vessel a distance less than half of the radius of the vessel.

BRIEF DESCRIPTION OF THE DRAWINGS

The above advantages and features of the invention and embodiments thereof will be further apparent from the following drawings and detail description, in which:

FIG. 1B shows the dimensions of a source in accordance with the prior art;

FIG. 2C shows the dimensions of a source in accordance with a first aspect of the present invention;

FIG. 3 is a plan cross sectional view of a vessel, source well and nozzle positioned at one of several vertical positions in the vessel according to a second aspect of the present invention.

DETAILED DESCRIPTION OF THE INVENTION

Figure 1:
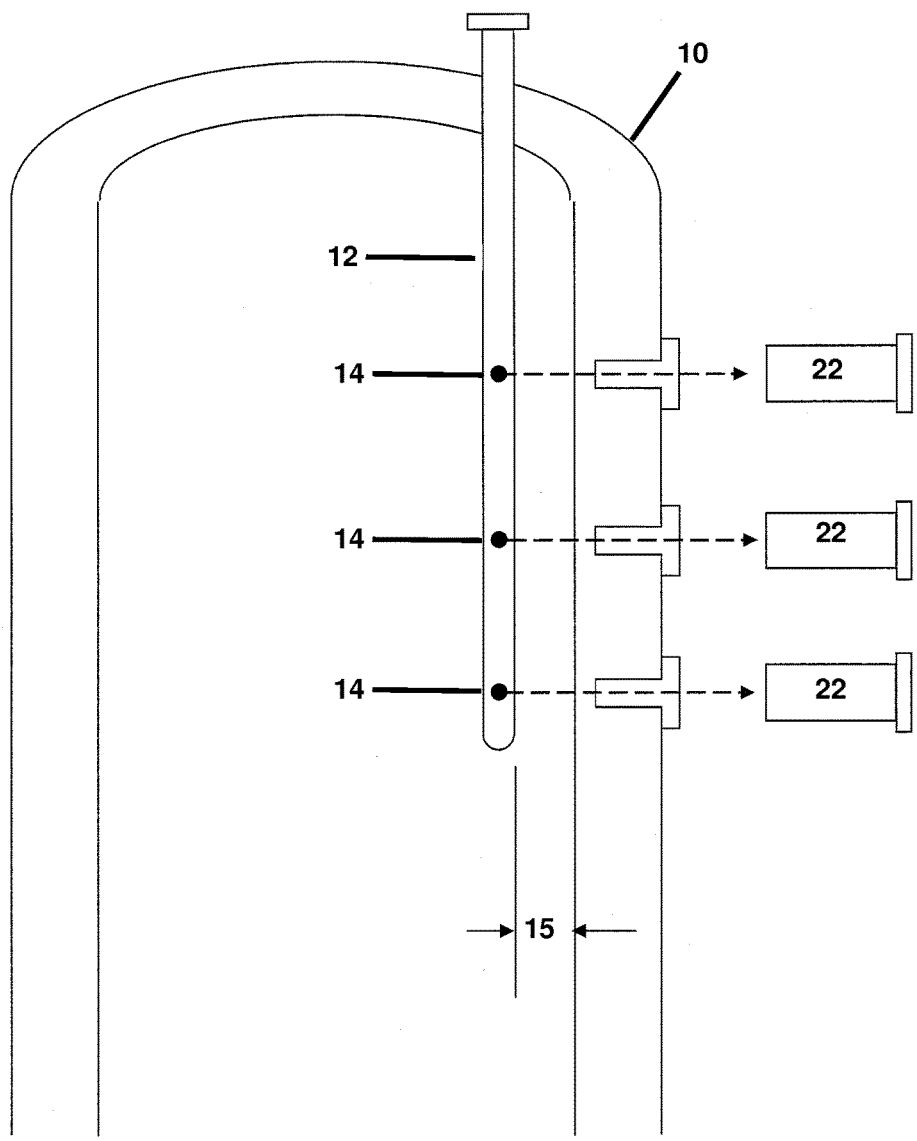
FIG. 1 is a cross sectional view of a vessel and source well in accordance with the prior art.
Figure 2B:
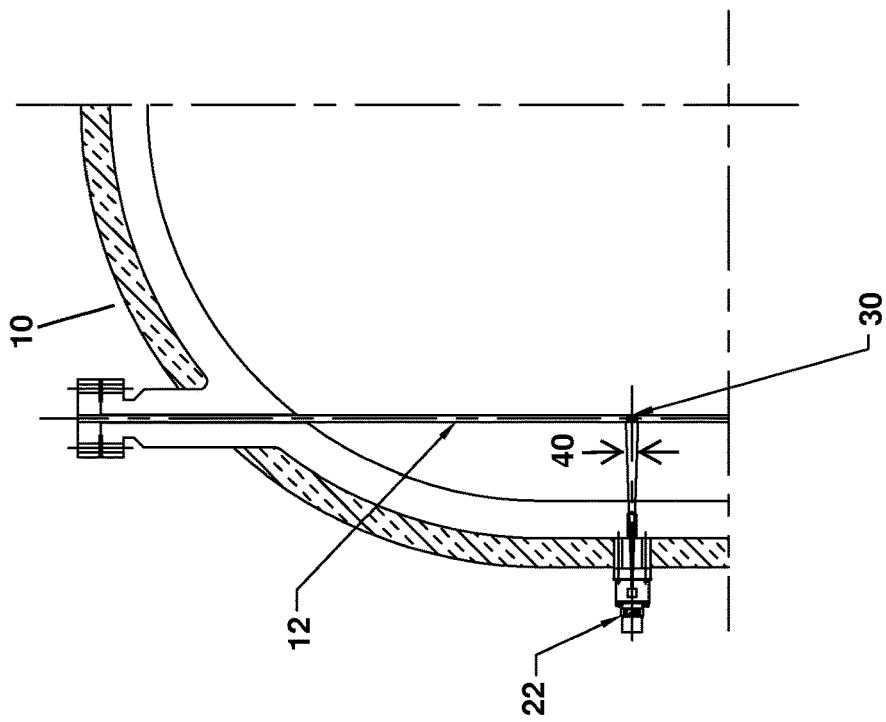
FIG. 2B is a detailed cross sectional view of the vessel of FIG. 2A showing the relative position of a source and a detector.
Figure 2A:
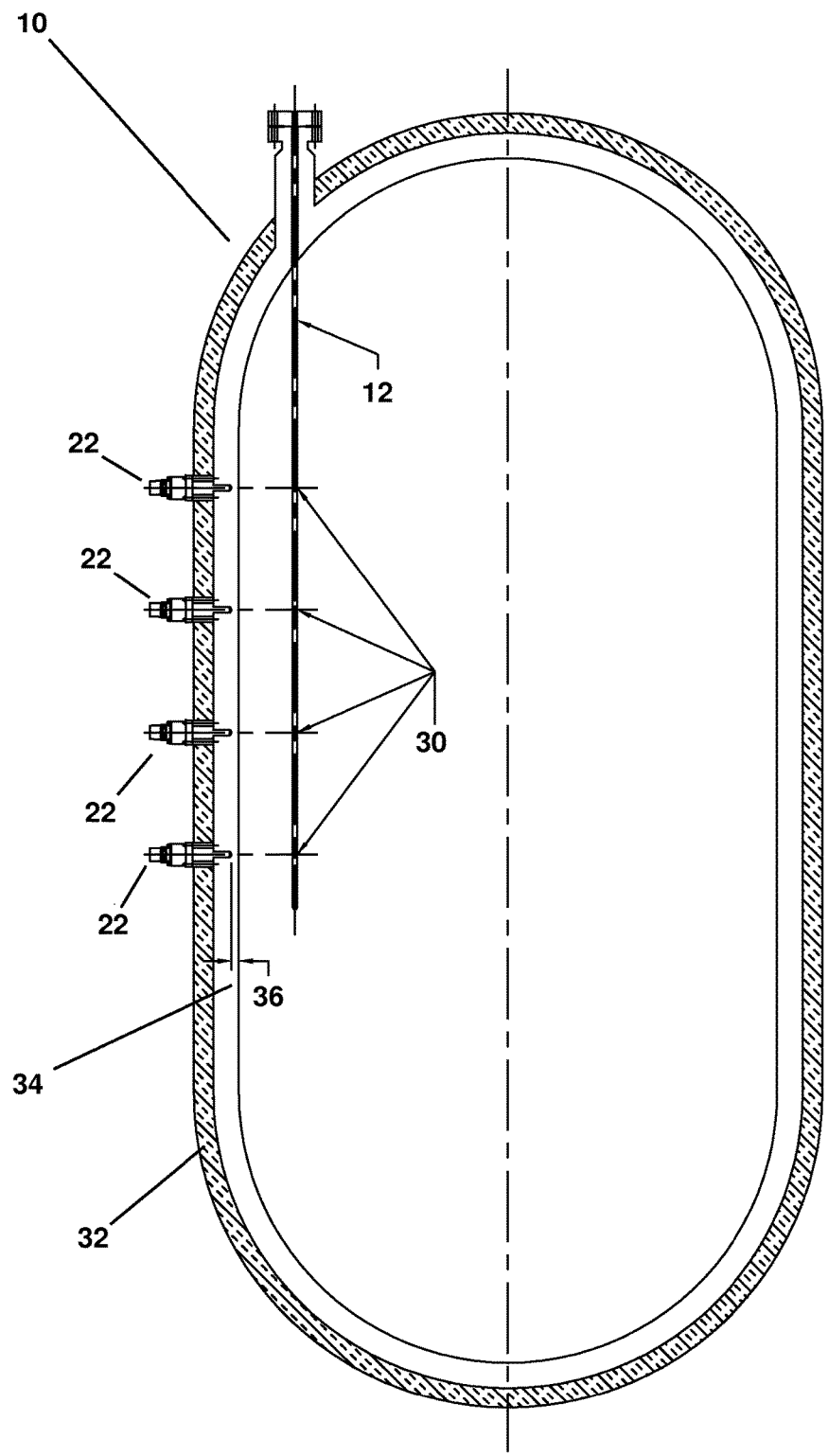
FIG. 2A is a cross sectional view of a vessel and source well using distributed activity sources in accordance with a first aspect of the present invention.

FIG. 2A illustrates a level sensing gauge configuration for a vessel 10 in accordance with the first aspect of the present, in which the point sources 14 shown in the embodiment of FIG. 1, are replaced with uniformly distributed sources 30, having a length dimension of 3 to 4 inches long. In this particular embodiment each point source, as in the prior art, is associated with a detector 22, positioned in a nozzle that extend through the vessel wall. In the particular illustrated embodiment, the nozzle extends through external insulation 32 surrounding the vessel, and terminates within the vessel wall 34 approximately 2.6 inches from the interior surface, as noted at 36.

The elongated dimension of the source 30 according to the principles of the present invention can be seen by reference to FIG. 2C. The desired length of the distributed activity is determined for each particular application, based upon the expected range of thermal expansion and contraction for the process and application in question. In the illustrated embodiment the distributed source has a length of thee inches, as seen at 31. This is to be compared with the 'point' sources 14 used in the prior art, shown in FIG. 1C, which typically have a nominal active length 15 of, for example, one-quarter inch, and typically well less than one inch.

Figure 1A:
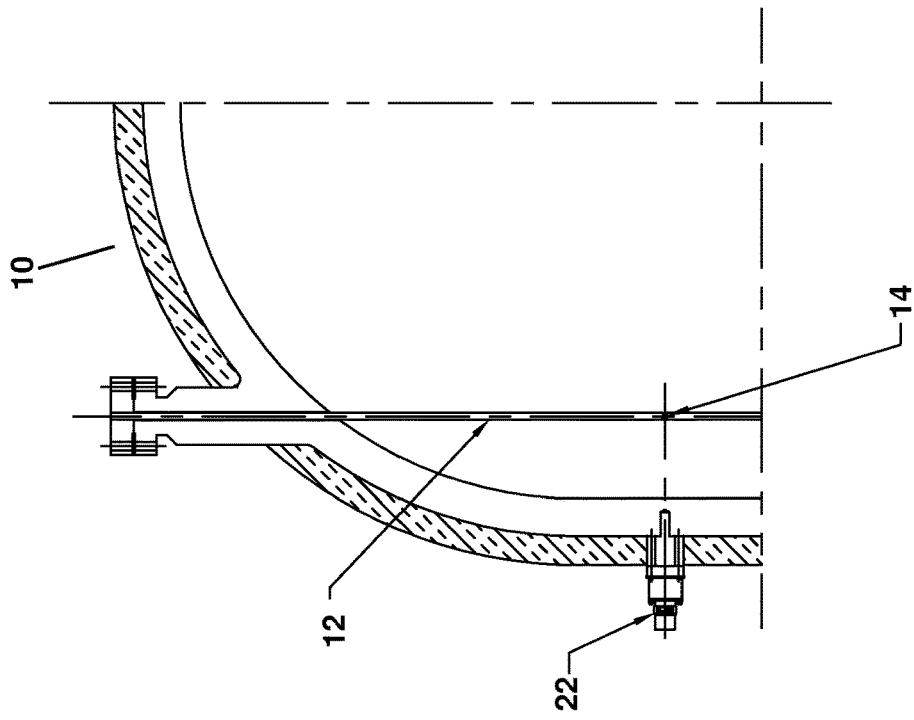
FIG. 1A is a detailed cross sectional view of the vessel of FIG. 1 showing the relative position of a source and a detector in accordance with the prior art.

FIG. 2B illustrates the source 30 of FIG. 2C is use in a vessel 10. As seen in FIG. 2B, the distributed source 30 permits a misalignment of greater than one inch between the source height in the source well 12 and the location of the detector 22 in the nozzle, while still providing adequate illumination of the detector 22 by maintaining the source within the illumination region 40 that reaches the detector. The compares favorably with the prior art configuration seen in FIG. 1A, in which the 'point' source 14 has a length of only a one-eighth to one-half inch and can be easily misaligned with the illumination region of the detector 22, as a consequence of thermal expansion or contraction of the vessel as temperatures vary from the calibration temperature. The scope of this problem is magnified in processes with wide temperature variation such as metal smelting and the like. Even wide thermal expansion and contraction ranges can be handled by a source 30 in accordance with the present invention because it may be configured to have a distributed length of any required extent.

FIG. 3 is an illustration of an alternative aspect of the present invention for ameliorating the effect of thermal expansion and contraction of a vessel 10 having a cylindrical shape. In the illustrated embodiment the cylindrical vessel has a diameter 44 of approximately 200 inches and a substantially greater height. The detector 22 is positioned in a nozzle which extends through the outer insulation 32 surrounding the vessel and a few inches short of the interior vessel wall as seen at 36.

In the illustrated embodiment, a source well 12' is included in the vessel, adjacent to the detector nozzle, at approximately the same height within the vessel, the detector nozzle and source well 12' spaced from each other a short horizontal distance, e.g., substantially less than 45 degrees around the diameter of the vessel and less than one quarter of the distance around the vessel 10. As will be appreciated, vertical elongation or contraction of the vessel 10 will not substantially alter the relative position of a source in the source well 12' and the detector 22, and thus this aspect of the invention also ameliorates this challenge to operation. Horizontal expansion of the vessel will have a limited effect upon the relative position of a source in the source well 12' and detector 22 because of the close spacing of the well and detector.

The centerline axes of the level sensing nozzle and level sensing well at are an angle of approximately 45 degrees. Since the well 12' and nozzle and detector 22 are spaced well under 45 degrees apart around the perimeter of the tank, the relative angle of the well 12' and nozzle and detector 22 are such that the source well extends into the vessel 10 less than half of the radius of the vessel, to a position relative to the vessel wall that is roughly the same as that seen in FIGS. 1A and 2, thus permitting the detector 22 to operate with the same level of illumination from the source as in other configurations, while ameliorating the effects of thermal expansion and contraction of the vessel 10.

The invention disclosed herein includes a number of aspects which have been illustrated in a good deal of particularity, the invention in its broadest aspects is not limited to those details and particulars, but rather the protection sought to be obtained and established herein is to be understood by reference to the following claims.

The invention claimed is:

1. A level sensing gauge for a vessel comprising a source well and one more level sensing nozzles, comprising
   one or more distributed sources of radiant energy each held within a source holder inserted within the source well, the one or more sources producing a radiation pattern, wherein radiation emitted within the pattern is not obstructed by the source holder;
   one or more detectors of radiant energy positioned outside the vessel and engaged to the level sensing nozzles, in registration with the one or more distributed sources;
   wherein the distributed sources are configured to radiate energy toward respective ones of the one or more level sensing nozzles in a radiation pattern illuminating a length of greater than one inch of the respective level sensing nozzle, such that thermal expansion or contraction of the vessel that alters the alignment of a source within the source well and nozzle does not significantly alter the amount of radiation illuminating the nozzle.

2. The level sensing gauge of claim 1 further comprising a plurality of radiant energy detectors and a plurality of distributed sources of radiant energy, each respective source and respective detector positioned so that radiant energy from the source illuminates the detector.

3. The level sensing gauge of claim 1 wherein the radiant energy detectors are detectors of nuclear radiation and the distributed radiant energy sources emit nuclear radiation.

4. A level sensing radioactive source and source holder for use in a source well of a level sensing gauge to irradiate a radioactivity detector for level measurement, the source emitting a radiation pattern, wherein radiation emitted within the pattern is not obstructed by the source holder, the pattern being an elongated, distributed activity pattern over a length greater than one inch.

5. A level sensing apparatus comprising
   a vessel, the vessel comprising a plurality of level sensing nozzles and a plurality of level sensing wells, wherein each respective nozzles is positioned adjacent to a respective one of said level sensing wells,
   a plurality of sources of radiant energy, each source held within a source holder respectively inserted within a respective one of the plurality of level sensing wells, the sources each producing a radiation pattern, wherein radiation emitted within the pattern is not obstructed by the source holder,
   and one or more detectors of radiant energy, each respective detector positioned outside the vessel in registration with a respective one of the plurality of level sensing nozzles, wherein each respective source is configured to radiate energy toward a respective level sensing nozzle and the detector in registration therewith in a pattern having a length of greater than one inch.

6. The level sensing apparatus of claim 5 wherein the sources of radiant energy emit nuclear radiation, and the detectors are detectors of nuclear radiation.

7. The level sensing apparatus of claim 5 wherein each respective level sensing nozzle is positioned at approximately identical vertical height as the respective adjacently positioned level sensing well.

8. The level sensing apparatus of claim 5 wherein each level sensing nozzle is spaced from the respective adjacently positioned level sensing well less than one quarter of a horizontal distance around the vessel.

9. The level sensing apparatus of claim 5 wherein a centerline axis of a respective level sensing nozzle is at an angle of approximately forty-five degrees relative to a centerline axis of the respective adjacently positioned level sensing well.

10. The level sensing apparatus of claim 5 wherein the source wells extend into the vessel horizontally.

11. The level sensing apparatus of claim 5 wherein the source wells extend into the vessel a distance less than half of the radius of the vessel.

* * * * *

UNITED STATES PATENT AND TRADEMARK OFFICE
CERTIFICATE OF CORRECTION

PATENT NO.         : 10,197,429 B2
APPLICATION NO.    : 13/621490
DATED              : February 5, 2019
INVENTOR(S)        : Bonaventure Cahill It is certified that error appears in the above-identified patent and that said Letters Patent is hereby corrected as shown below:

On the Title Page

Item (57) Abstract, Lines 1-2, delete: "A nuclear level sensing gauge for a vessel 10 comprises a vertical source well 12 and one more level sensing detectors ...", replace with: --A nuclear level sensing gauge for a vessel 10 comprises a vertical source well 12 and one or more level sensing detectors--.

In the Specification

Column 1, Lines 52-53, delete: "... gauge for a vessel comprising a source well and one more level sensing nozzles, ...", replace with: --... gauge for a vessel comprising a source well and one or more level sensing nozzles, ...--.

Column 2, Line 68, delete: "... a vessel 10 in accordance with the first aspect of the present, ...", replace with: --... a vessel 10 in accordance with the first aspect of the present invention, ...--.

Column 3, Lines 5-6, delete: "... is associated with a detector 22, positioned in a nozzle that extend through the vessel wall.", replace with: --... is associated with a detector 22, positioned in a nozzle that extends through the vessel wall.--.

Column 3, Line 18, delete: "... thee inches, as seen at 31.", replace with: --... three inches, as seen at 31.--.

Column 3, Lines 30-32, delete: "The compares favorably with the prior art configuration seen in FIG. 1A, in which the 'point' source 14 has a length of only a one-eighth to one-half inch and can be easily ...", replace with: --This compares favorably with the prior art configuration seen in FIG. 1A, in which the 'point' source 14 has a length of only one-eighth to one-half inch and can be easily ...--.

Column 4, Line 3, delete: "...relative angle of the well 12' and nozzle and detector 22 are ...", replace with: --...relative angles of the well 12' and nozzle and detector 22 are ...--.

Signed and Sealed this
Third Day of September, 2019

Andrei Iancu
*Director of the United States Patent and Trademark Office*

In the Claims

Column 4, Lines 18-19 Claim 1, Lines 1-2, delete: "A level sensing gauge for a vessel comprising a source well and one more level sensing nozzles, comprising ...", replace with: --A level sensing gauge for a vessel comprising a source well and one or more level sensing nozzles, comprising ...--.

Column 4, Line 55 Claim 5, Line 4, delete: "... each respective nozzles is positioned adjacent to a ...", replace with: --... each respective nozzle is positioned adjacent to a ...--.